Dec. 8, 1959    R. C. JOHNSTON    2,916,243
CAMERA SUPPORT
Filed May 21, 1956
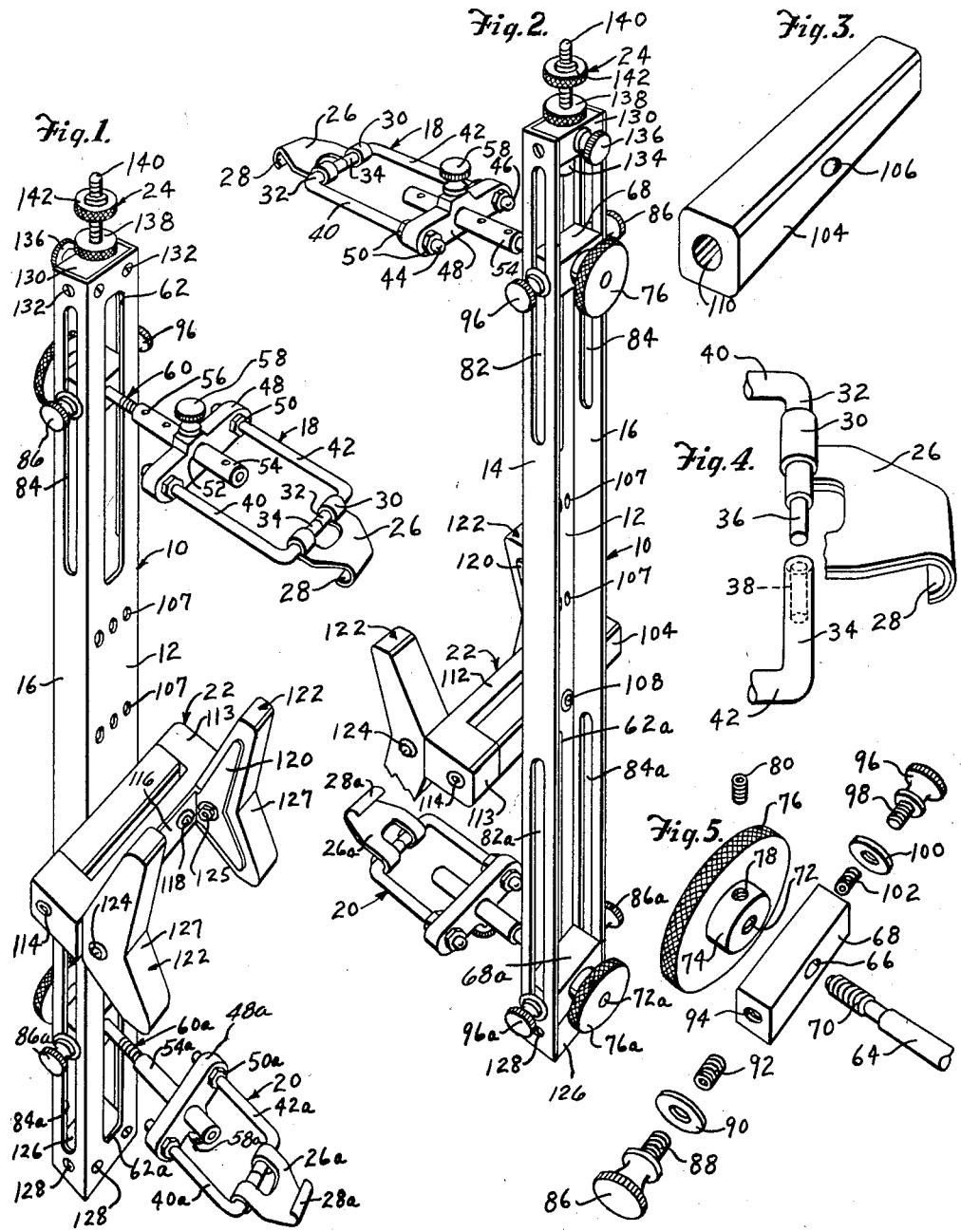
Robert C. Johnston INVENTOR.
BY Robert G. Mentag
ATTORNEY United States Patent Office 2,916,243
Patented Dec. 8, 1959

2,916,243

CAMERA SUPPORT

Robert C. Johnston, Detroit, Mich.

Application May 21, 1956, Serial No. 586,065

7 Claims. (Cl. 248—226)

This invention relates to a camera support and, more particularly, to a camera support adapted for attachment to the instrument board or dash board of a vehicle whereby, a camera may be operated in an efficient manner while the vehicle is moving.

In many instances, when traveling through picturesque countrysides, it is desirous to take moving pictures of said countryside while passing therethrough in a moving vehicle. Heretofore, in order to take pictures from a moving vehicle, it was necessary to hold the movie camera in the hands of the operator and it was not possible to obtain good photographic results. Accordingly, it is the primary object of this invention to provide a support for mounting a movie camera on the instrument board or dash board of a vehicle, whereby, excellent moving pictures may be taken of the surrounding countryside as the vehicle moves therethrough. The camera support of the present invention provides a steady rest for the movie camera so that the operator is relieved of the job of holding the camera and merely has to concentrate on directing the camera towards the part of the countryside to be photographed.

It is another object of this invention to provide a support means for mounting a movie camera on the instrument board or dash board of a vehicle, and, which support means is adjustable, whereby the camera can be adjusted for taking pictures in a desired direction.

It is a further object of this invention to provide a camera support adapted for mounting a movie camera on the instrument board or dash board of a vehicle, and, which includes an elongated vertical carrier member, which the camera is mounted on, and which further includes a pair of spaced apart clamping means for engaging the instrument board, and which clamping means are adjustable whereby, the vertical carrier member may be adjusted so as to position the camera in a desired position for taking pictures through the window area of a vehicle.

It is a still further object of this invention to provide an adjustable camera supporting means for mounting on the instrument board or dash board of a vehicle, and, which is simple and compact of construction, economical of manufacture and efficient in operation.

Other objects, features and advantages of this invention will be apparent from the following detailed description and appended claims, reference being had to the accompanying drawing forming a part of the specification wherein like reference numerals designate corresponding parts of the several views.

In the drawing:

Fig. 1 is a front perspective view of an illustrative embodiment made in accordance with the principles of the invention;

Fig. 2 is a rear perspective view of the structure illustrated in Fig. 1;

Fig. 3 is an enlarged perspective view of part of the structure illustrated in Figs. 1 and 2;

Fig. 4 is an enlarged, partial, broken perspective view of one of the clamps used in the structure illustrated in Figs. 1 and 2; and, Fig. 5 is an enlarged exploded view of an adjusting means used in the structure illustrated in Figs. 1 and 2, with the parts separated to show their relationship.

Referring now to the drawing, and, more particularly to Figs. 1 and 2, wherein is illustrated a preferred embodiment of the invention, the numeral 10 generally indicates a substantially vertical elongated carrier member or channel which is U-shaped in cross-section. The carrier member 10 includes a front wall 12 and a pair of integral side walls 14 and 16. The carrier member 10 is provided with upper and lower adjustable clamping means generally indicated by the numerals 18 and 20, an intermediately disposed, swivelly mounted rest means 22, and, a camera mounting means 24.

The upper adjustable clamping means 18 includes the bracket 26 which is provided with a curved end portion 28 to form a hook means on one end thereof, and which is provided with a pair of spaced apart eyelets or journal members as 30, on the other end thereof. Rotatably mounted in the journal members 30 are the stub shafts 32 and 34. The shaft 32 is provided with a reduced extension 36 which is adapted to be slidably mounted in the aperture 38 in the end of the shaft 34.

The shafts 32 and 34 are integral with a pair of spaced apart rearwardly extending arms 40 and 42, respectively, which are threaded at their rear ends, as at 44 and 46. A cross bar 48 is provided with suitable apertures in which are fixedly mounted the threaded arm ends 44 and 46, by means of suitable lock nuts, as 50.

The cross bar 48 is provided with a centrally disposed aperture therethrough, as 52, which is parallel to the arms 40 and 42, and in which is adjustably mounted the sleeve member 54. The sleeve member 54 is provided with a plurality of apertures as 56 in which the end of the adjustable screw 58 may be selectively positioned. The screw 58 is threadably mounted in the top side of the cross bar 48 and extends down into the aperture 52 so as to operatively engage the desired aperture 56, depending on where the sleeve 54 is slidably positioned in the aperture 52.

Threadably mounted in the sleeve 54 is a shaft 60 which extends through the elongated slot 62 in the front wall 12 of the channel or carrier member 10. The rear end portion 64 of the shaft 60 is rotatably mounted in the horizontal aperture 66 in the block 68 which is slidably mounted in the vertical U-shaped channel 10. The extreme end of the shaft 60 is threaded as at 70, and is threadably mounted in the threaded aperture 72 which extends through the hub 74 which is integral with the knurled thumb wheel or adjusting knob 76. The hub 74 is provided with a threaded aperture 78 which intersects the aperture 72 and in which is threadably mounted a suitable lock screw, as the allen screw 80, which is adapted to retain or lock the shaft 60 in the aperture 72.

The side walls 14 and 16 of the vertical channel 10 are provided with elongated slots 82 and 84, respectively. A knob 86 is provided with a threaded screw end 88 on which is carried a washer 90. The screw end 88 projects through the slot 84 and is threadably mounted in the threaded aperture 94 in one end of the block 68. A coiled spring 92 is disposed in the aperture 94 and functions to maintain an outward bias on the screw end 88 to take up any end-play in the threaded connection between the screw end 88 and the threaded aperture 94. The washer 90 abuts the outer face of the channel wall 14 as shown in Fig. 2. The other end of the block 68 is similarly supported by means of the knob 96, screw end 98, washer 100, and spring 102, and a threaded aperture (not shown) in said other end of the block. The screw end 98 being mounted through the elongated slot 82.

The lower clamping means 20 is constructed in the same manner as the upper clamping means 18, and the corresponding parts have been marked with the same reference numerals with a small "a" added thereto. The cross bar 48a in the clamping means 20 is turned upside down so as to turn the hook shaped end 28a upwardly for clamping onto the lower edge of the vehicle dash board.

The swivelly mounted rest means 22 comprises a horizontal member 104 provided with a threaded aperture 106 on the rearward side thereof which is adapted to be aligned with any one of a plurality of apertures as 107 in the front wall 12 of the channel 10. A suitable threaded bolt as 108 is operatively mounted through the desired aperture 107 and into the aperture 106 to fixedly retain the member 104 on the channel 10. The member 104 is secured to the channel 10 in any one of the apertures 107 depending on what level the rest means 22 is to be disposed relative to the clamping means 18 and 20. The ends of the horizontal member 104 are provided with apertures as 110. A U-shaped member 112 is seated around the horizontal member 104 and is swingably mounted thereon, by means of suitable pins or the like passing through the arms 113 and into operative engagement with the apertures 110.

Fixedly mounted on the front face of the horizontal bight portion of the member 112 is a plate 116, by means of the screws 118, or any other suitable means. The plate 116 is provided with an integral forwardly extending part, as 120, on each end thereof, which are fixedly attached to the abutment members 122 by any suitable means, as by the bolts 124 and the nuts 125. The abutment members 122 are preferably made from a suitable resilient material as rubber or the like. The front faces 127 of the abutment members 122 are formed to fit the surface which they are to engage, as for example, a curved surface, and so forth. The abutment members 122 are spaced apart to provide an efficient and steady rest means for the channel 10.

The lower end of the channel 10 is enclosed by means of the block 126 which is fixedly secured in place inside the channel by any suitable means, as by the screws 128. The upper end of the channel 10 is enclosed by a similar block 130 which is fixedly secured in place inside the channel by any suitable means, as by the screws 132. The block 130 is provided with a vertical aperture therethrough (not shown) in which is rotatably carried the pin 134. A lock screw having the knob 136 fixed thereon is threadably mounted in a horizontal position in the block 130 and is adapted for locking the pin 134 in any desired position. An abutment member 138 is fixed on the upper end of the pin 134 and abuts the upper face of the block 130. Extending upwardly from the abutment member 138 is an integral threaded mounting screw 140 on which is threaded a lock nut 142. The screw 140 is of the standard size adapted to be threaded in the lower side of a movie camera into the usual threaded aperture provided in such cameras for such purposes, as for mounting on a tripod. The lock nut 142 would be threaded upwardly into engagement with the lower face of the camera to lock the camera in any desired position on the screw.

In use, the hook shaped end 28 of the upper clamping means would be engaged in the defrosting unit outlet in the vehicle instrument board or dash board, and the hook shaped end 28a of the lower clamping means would be engaged around the lower edge of the vehicle instrument board or dash board. The rest means 22 would abut or rest on the face of the dash board. The camera mounting support would then be secured in place by rotating the knobs 76 and 76a to draw the rest means 22 into a secure engagement with the dash board. If it is desired to tilt the channel 10 from the vertical plane, it is only necessary to thread the upper threaded shaft 60 outwardly of the sleeve 54, while simultaneously threading the lower threaded shaft 60a inwardly of the sleeve 54a. The rest means member 112 will pivot about the member 104 on the pins 114, and the abutment members 122 will remain in engagement with the dash board.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. A camera support of the class described, comprising: a vertical elongated carrier member; means on the upper end of said carrier member for releasably mounting a camera thereon; a first clamping means adjustably mounted on said carrier member adjacent the upper end thereof; a second clamping means adjustably mounted on said carrier member adjacent the lower end thereof; and, a swivelly mounted rest means mounted on said carrier member between said clamping means.

2. The structure as defined in claim 1, wherein: said clamping means each includes a swingably mounted hook shaped member carried on arms adjustably mounted on said carrier member for lateral movement toward and away from said carrier member.

3. The structure as defined in claim 2, wherein: said arms are mounted on said carrier member for adjustment longitudinally of said carrier member.

4. The structure as defined in claim 3, wherein: said rest means includes a pair of laterally spaced apart abutment members swivelly mounted on a horizontal bar fixedly mounted on said carrier member between said clamping means.

5. A camera support of the class described, comprising: a vertical elongated carrier member; means on the upper end of said carrier member for releasably mounting a camera thereon; a first clamping means adjustably mounted on said carrier member adjacent the upper end thereof; a second clamping means adjustably mounted on said carrier member adjacent the lower end thereof; a swivelly mounted rest means mounted on said carrier member between said clamping means; each of said clamping means including a block adjustably movable longitudinally in said carrier member; and, means extending laterally outwardly from said block for swingably mounting a hook shaped member.

6. The invention as defined in claim 5, wherein: said means extending outwardly from said block comprises, a shaft rotatably mounted in said block and extending therethrough, a knob on one end of said shaft for adjusting said shaft in said block, a sleeve threadably mounted on the other end of said shaft, said sleeve being adjustably mounted in a cross bar, a pair of arms extending outwardly from said cross bar for swingably mounting said hook shaped member.

7. A camera support for mounting a camera on the dash board of a vehicle, comprising: a vertical elongated carrier member; means on the upper end of said carrier member for releasably mounting a camera thereon; a first arm swingably carried on said carrier member adjacent the upper end thereof; a first clamping member swingably carried on said first arm and being adapted to be operatively clamped on the upper edge of the dash board; a second arm swingably carried on said carrier member adjacent the lower end thereof; a second clamping member swingably carried on said second arm and being adapted to be operatively clamped on the lower edge of the dash board; and, a rest means swivelly mounted on said carrier member between said clamping members and being adapted to abut the dash board.

References Cited in the file of this patent

UNITED STATES PATENTS

| | | |
|---|---|---|
| 2,214,302 | Keller et al. | Sept. 10, 1940 |
| 2,219,169 | Alter | Oct. 22, 1940 |
| 2,271,616 | Beale | Feb. 3, 1942 |
| 2,755,053 | Sloane | July 17, 1956 |
| 2,783,367 | Locke | Feb. 26, 1957 |
| 2,804,278 | Jewett | Aug. 27, 1957 |

FOREIGN PATENTS

| | | |
|---|---|---|
| 547,802 | France | Oct. 3, 1922 |